United States Patent [19]

Pechard et al.

[11] 4,089,577
[45] May 16, 1978

[54] DISTRIBUTING DEVICE FOR A MULTICONDUCTOR CABLE

[75] Inventors: Lucien Leon Pechard, Dole; Bernard Andre Logerot, Mont-sous-Vaudrey, both of France

[73] Assignee: Bunker Ramo Corporation, Oak Brook, Ill.

[21] Appl. No.: 763,737

[22] Filed: Jan. 28, 1977

[30] Foreign Application Priority Data

Feb. 9, 1976 France .............................. 76 04363

[51] Int. Cl.² .......................................... H01R 29/00
[52] U.S. Cl. .............................. 339/18 P; 200/51.1; 339/32 R; 339/150 B; 339/198 R
[58] Field of Search .......... 339/18, 19, 198 R, 198 G, 339/198 GA, 198 H, 198 N, 198 M, 32 R, 32 M, 147 P, 222, 150 B, 150 T; 200/51.09, 51.1; 179/1 PC, 96–98

[56] References Cited

U.S. PATENT DOCUMENTS

| 2,088,480 | 7/1937 | Mylius .................................. 200/51.1 |
| 2,192,826 | 3/1940 | Cole ...................................... 200/51.1 |
| 3,535,463 | 10/1970 | Trucco ......................... 339/198 GA |
| 3,627,929 | 12/1971 | Vlijmen et al. ...................... 200/51.1 |

FOREIGN PATENT DOCUMENTS 1,168,526   9/1958   France .................................... 339/19

Primary Examiner—Neil Abrams
Attorney, Agent, or Firm—William Lohff; F. M. Arbuckle

[57] ABSTRACT

A distributing device made up of a set of modular elements for use with multiconductor cables. Each of the modular elements includes symetrically arranged pairs of conductors. Each pair of conductors includes an incoming conductor to be connected to one wire of the multiconductor cable and an outgoing conductor to be connected to a jumper wire. The two conductors are normally shorted together by a spring contact. A plug is provided which by partial insertion allows connection to the conductors of a pair without interrupting the connection between the two conductors, and upon complete insertion, pushes the spring contact away from the conductors to interrupt the connection between the two conductors.

11 Claims, 4 Drawing Figures

DISTRIBUTING DEVICE FOR A MULTICONDUCTOR CABLE

BACKGROUND OF THE INVENTION

1. Field of the Invention

This device relates to the field of distributing devices for multi-conductor cables, and more particularly to distributing devices which allow modification of the circuits by the insertion of a plug.

2. Description of the Prior Art

Considering the high number of connections in a telephone switching center, there are several requirements of equipment to be used there.

First, there is the importance of space. Sufficient space must be provided for connecting each wire of a multiconductor cable to a distributing device without the risk of causing a short between two adjacent wires. However, space is at a premium and must not be wasted due to a poor design of the distributing device.

Second, the circuits must be accessible, both at their incoming and their outgoing ends without the necessity of disconnecting wires to effect a measurement or modification of the circuit. The existing devices used for this purpose are removable cable riders which occupy a considerable amount of space.

Thirdly, compatibility is very important. Any new devices must be capable of use with, and direct replacement of, prior devices without major modifications.

Finally, flexibility is important. Due to the delay of construction, as well as for evident economic reasons, it is necessary to be able to temporarily use portions of one cable for satisfying an excess demand on another cable. With known devices, this operation is relatively complicated.

SUMMARY OF THE INVENTION

It is therefore an object of the present invention to provide a modular distributing device, whereby only the capacity required by a particular cable need be provided.

It is a further object of the present invention to provide a distributing device which includes an interruptable shorting means, whereby the incoming conductor can be disconnected from the outgoing conductor without the necessity of disconnecting a wire.

It is another object of the present invention to provide a distributing device, wherein a branch conductor can be connected to the circuit without interrupting the connection between the incoming and outgoing conductors, or alternatively a branch conductor can be connected to each of the incoming and outgoing conductor, and the normal connection between them can be interrupted.

It is an additional object of this invention to provide a distributing device, wherein any of the necessary branching operations can be effected with a single plug.

Other objects and advantages of the present invention will become obvious from the following description.

BRIEF DESCRIPTION OF THE DRAWINGS

The invention will now be described in detail with reference to the accompanying drawings representing a preferred embodiment of the distributing device.

DESCRIPTION OF THE PREFERRED EMBODIMENTS

Figures 1, 2:
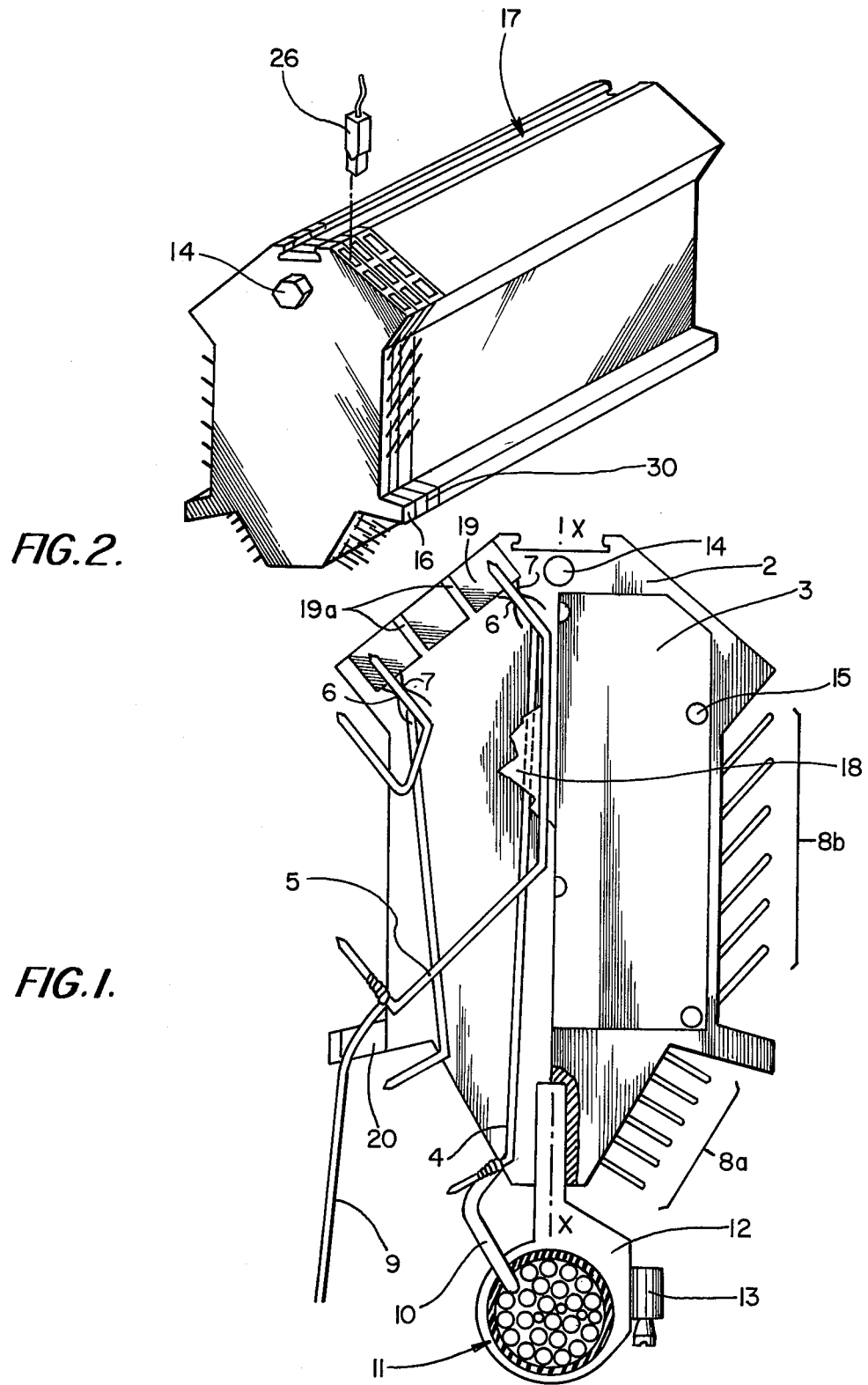
FIG. 1 is a partial sectional view of a singular modular element.
FIG. 2 is a perspective view of the distributing device showing several representative modular elements.

Reference is made to FIGS. 1 and 2.

The device of the present invention includes modular elements 16 symetrical in relation to a longitudinal axis X—X. Each element comprises two plates 2, 3 of insulating material connected by rivets 15, with an insulating plate 18 separating conducting bars 4 and 5.

The incoming wires are connected to the bars 4, which are grouped in sets of six on either side of the X—X axis and extend to the bridging points in the cavities 19. Bulkheads 19a separate individual cavities.

From cavities 19, bars 5 extend and are connected to distributing jumping wires 9.

The interruptable electrical connection between the incoming and outgoing conductors is made by the spring contacts 6 and 7. One end of each spring is attached to the insulating plate and the other end is slotted in its middle and resiliently contacts bars 4 and 5.

In each cavity 19 are located the ends of four conductors, two incoming conductors and two outgoing conductors.

The incoming conductors 8a for connection to wires 10 of cable 11 supported by cable carrier 12 and clamp 13, are constituted by the six ends of the bars 4 on each side of the axis X—X. Such an arrangement of connecting points avoids what is called in professional terms "combing" of the cable conductors, since it is not necessary to cut individual wires at different lengths from the insulating sheath of the cable.

The outgoing connecting points 8b are similarly grouped in sets of six on each side of the axis X—X and are similarly constituted by the ends of the bars 5 on which are wound the conductors 9 of the jumper wires. A wire guide 20 permits the routing of the jumper wires on each side of the modular element in order to facilitate their grouping.

An assembly screw 14 acts to connect a number of the modular elements 16 into a single unit for accommodating a multiconductor cable. The device can be placed on the arms of a frame with no need to dismount the elements 16, and the attachment screw 14 is accessible when the assembly of the unit is complete.

Between each element 16, a screen 30 can be interposed and connected to electrical ground to function as a shield when high frequency signals are employed.

A slot 17 permits the insertion of a lable to identify the cable connected to the device.

The arrangement of the wire connection terminals has been designed to allow easy access of a wire wrapping gun regardless of the environment in which the device is used.

The modular elements are disposed on the frame so that the measuring cavities 19 face the front of the frame and are readily accessible to the operator.

A measuring plug 26 can be introduced into any one of the measuring cavities 19 and permits any of the operations discussed below.

Figure 3:
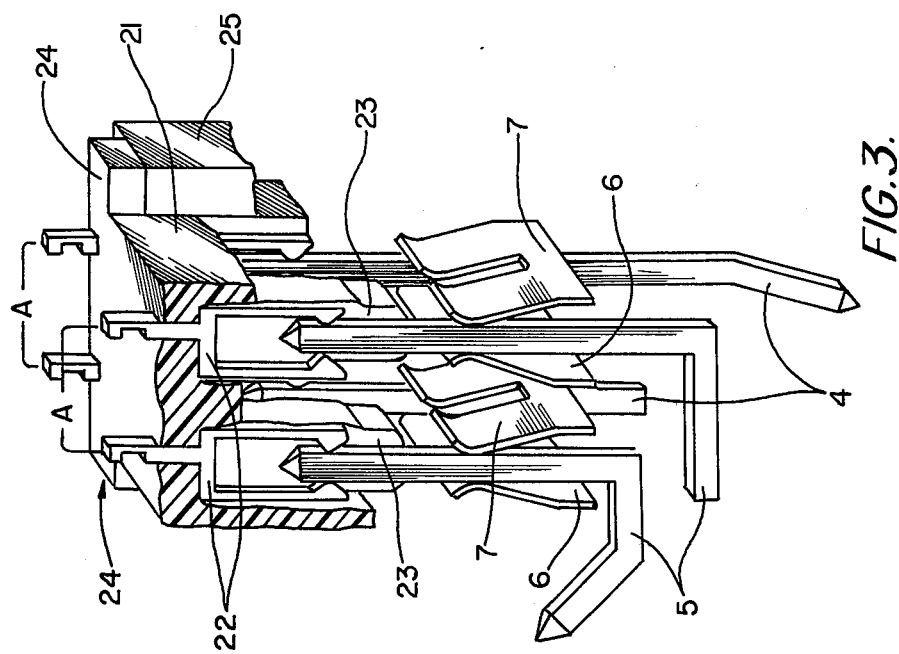
FIG. 3 is a partial sectional view of the measuring plug in the partially inserted position.

FIG. 3 represents plug 26 in the bypass position in which the normal connection between the incoming and outgoing conductors has not been interrupted. The plug 26 is comprised of a body 21 which contains four contacts 22 to which wires are connected at points A, B, and C. The contacts 22 are grouped in pairs in the same plane with the grooves in the body 21. The body 21 includes at least one angle plate 24 for polarizing the plug, and in this orientation engaging stop 25 of cavity 19 of module 16, thereby limiting the depth to which plug 26 can be inserted into cavity 19.

Figure 4:
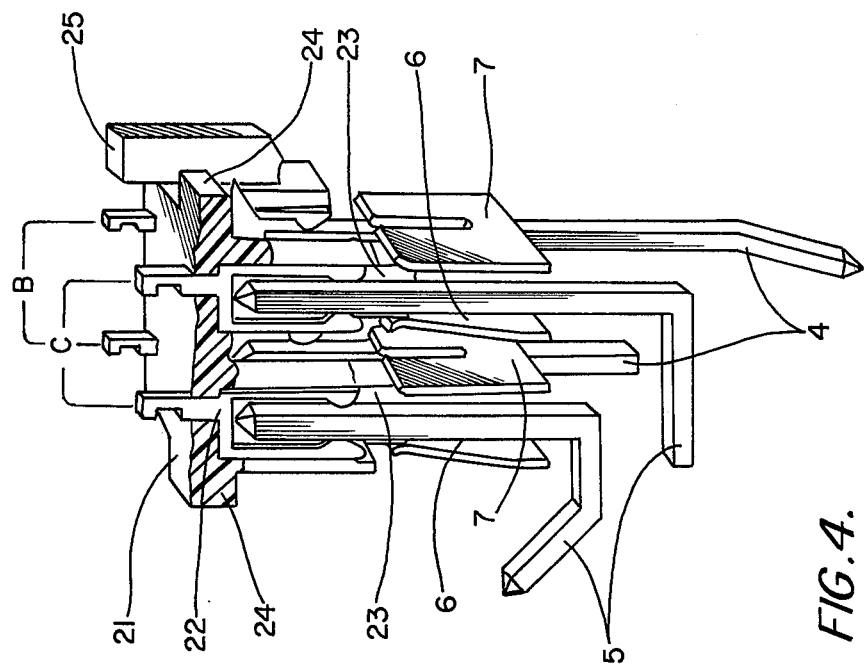
FIG. 4 is a partial sectional view of the measuring plug fully inserted and causing an interruption of the connection between the incoming conductor and the outgoing conductor.

FIG. 4 shows a similar plug 26 which has been rotated 180° about a vertical axis so that angle plate 24 slides past stop 25 allowing full insertion of plug 26 into cavity 19. Insulating wedge 23 has been forced in between the contacts 6 and 7 of the spring and conductors 4 and 5, causing an interruption of the connection between the incoming and outgoing conductors.

By selectively inserting a single plug 26 into the cavity 19, four separate operations can be effected.

1. Shorted measuring: By introducing the plug 26 in the orientation illustrated in FIG. 3 to the point where angle plate 24 engages stop 25, contacts A are connected to conductors 4 and 5 which are connected together by spring contacts 6 and 7.
2. Interruption without measuring, i.e., "blocking": By inserting plug 26 as shown in FIG. 4, the plug may be fully inserted into cavity 19 allowing the insulating wedges 23 to separate contacts 6 and 7 from conductors 4 and 5, thereby interrupting the connection between the incoming and outgoing conductors.
3. Inwardly looking or outwardly looking measurement: By introducing the plug as in 2 above and connecting a measuring device to contacts B, a measurement across the incoming cable may be made. Similarly, by connecting a measuring device to contacts C, a measurement of the outgoing cable may be made.
4. Circuit modification: By inserting two plugs 26 into two different cavities 19 as described in 2 or 3 above and connecting wires between the contacts of the two plugs, the incoming wires of one circuit can be connected to the outgoing wires of a second circuit.

It can be readily realized that this invention can assume various embodiments. Thus, it is to be understood that the invention is not limited to the specific embodiments described herein, but is to be limited only by the appended claims.

The embodiments of the invention in which an exclusive property or privilege is claimed are defined as follows:

1. A distributing device for interconnecting the incoming conductors of a multiconductor cable to outgoing conductors, said distributing device including at least one modular element comprising:
   a body of insulating material;
   a plurality of contact element pairs, each of said pairs including an incoming contact element and an outgoing contact element and supported by said body, each of said contact elements having two ends, one end of each incoming contact element adapted to receive and terminate a conductor wire end from one of said incoming conductors and one end of each outgoing contact element adapted to receive and terminate a conductor end from one of said outgoing conductors;
   a corresponding plurality of shorting means for interruptably electrically connecting the second end of said incoming element with the second end of said outgoing contact element of each pair;
   plug means for making a connection with the second ends of one of said contact element pairs when mated with said one contact pair in a first orientation relative thereto and for making a connection with the second ends of said one contact element pair and interrupting the connection between said second ends of said one contact element pair when mated with said one contact element pair in a second orientation relative thereto;
   said first and second orientations being rotatively related to each other; and
   stop means associated with both said plug and said body for blocking said plug from interrupting said connection in said first orientation but permitting such interruption of said connection in said second orientation.

2. The distributing device as claimed in claim 1, wherein said body comprises at least one cavity opening to a side of said modular element, said cavity having a bottom wall through which the second ends of a pair of said contact element pairs protrude, said cavity being of a size to fittingly receive said plug means.

3. The distributing device as claimed in claim 2, wherein said plug means includes a separating wedge of insulating material to engage said shorting means and interrupt the connection between said incoming contact element and said outgoing contact element when said plug is fully inserted into said cavity.

4. The distributing device as claimed in claim 2, wherein said plug means includes polarizing means, whereby said plug means will enter said cavity in only preselected orientations.

5. The distributing device as claimed in claim 4, wherein said stop means includes a stop member formed at said cavity for limiting the depth to which said plug means can be inserted into said cavity when said plug means is in one of said preselected orientations, whereby said separating wedge will not interrupt the connection between said incoming contact element and said outgoing contact element.

6. The distributing device as claimed in claim 1, wherein said plug means comprises an insulating plug body supporting at least one contact member for matingly engaging one of said second ends of said contact element pair.

7. The distributing device as claimed in claim 1, wherein said shorting means comprises at least one spring contact, resiliently contacting said pair of contact elements.

8. The distributing device as claimed in claim 1, wherein said body further comprises an insulating plate between said incoming conductors and said outgoing conductors.

9. The distributing device as claimed in claim 1, wherein said distributing device includes a plurality of said modular elements and further comprising a grounded conductive screen between each of said modular elements.

10. The distributing device as claimed in claim 1, wherein said contact elements are arranged in two parallel rows.

11. The distributing device as claimed in claim 1, wherein said modular elements have an axis of symmetry, and the pairs of contact elements on one side of said axis are grouped for distribution to a single circuit.

* * * * *